United States Patent [19]
Plestan

[11] Patent Number: 5,743,478
[45] Date of Patent: Apr. 28, 1998

[54] FISHING REEL WITH ADAPTABLE LINE GUIDE ROLLER

[75] Inventor: Alain Plestan, Marignier, France

[73] Assignee: Mitchell Sports, Paris, France

[21] Appl. No.: 509,762

[22] Filed: Aug. 3, 1995

[30] Foreign Application Priority Data

Aug. 12, 1994 [FR] France .................... 94 10126

[51] Int. Cl.⁶ .................................. A01K 89/01
[52] U.S. Cl. ........................................... 242/231
[58] Field of Search ........................ 242/230, 231, 242/233, 232

[56] References Cited

U.S. PATENT DOCUMENTS 4,562,976  1/1986  Ban .......................................... 242/231
4,767,080  8/1988  Tsunoda et al. .
5,261,627  11/1993  Shinohara ................................ 242/231

FOREIGN PATENT DOCUMENTS 456 262 A  11/1991  European Pat. Off. ............... 242/231
1355745    2/1964   France .................................... 242/230
2 167 631  6/1986   United Kingdom .................... 242/233

Primary Examiner—Katherine Matecki
Attorney, Agent, or Firm—Foley & Lardner

[57] ABSTRACT

A fixed spool, rotary line recovery device fishing reel includes a rotary drum carrying a recovery device bail arm articulated to the drum at both ends. The first end of the bail arm carries a roller over which the line passes during recovery. The roller is cylindrical or slightly concave and of sufficient length to allow unimpeded axial movement of the line due to the amount of line wound onto the spool and due to the relative position of the recovery device relative to the fishing pole. This reduces the stresses exerted on the line and its gradual tendency to twist.

13 Claims, 3 Drawing Sheets

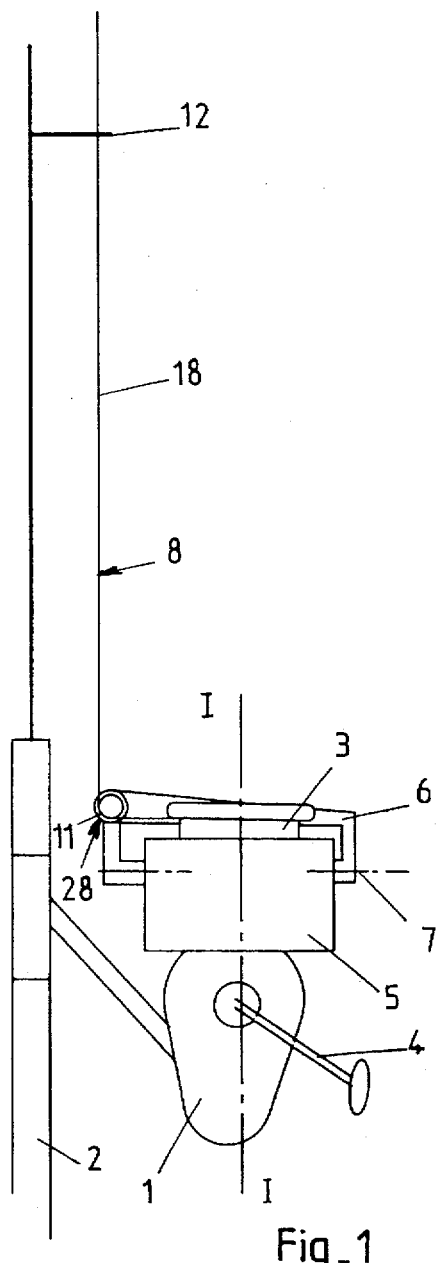
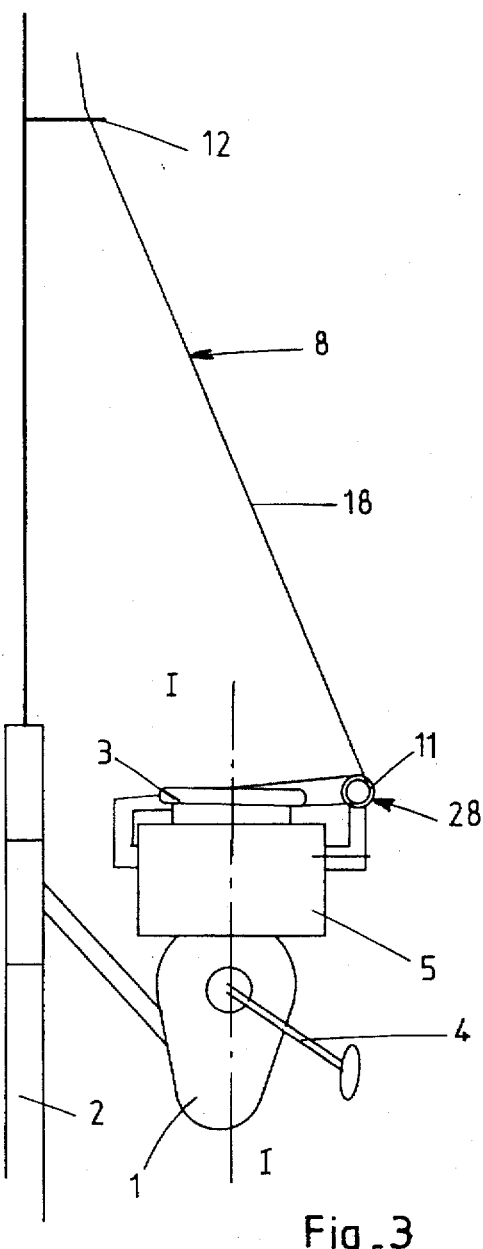
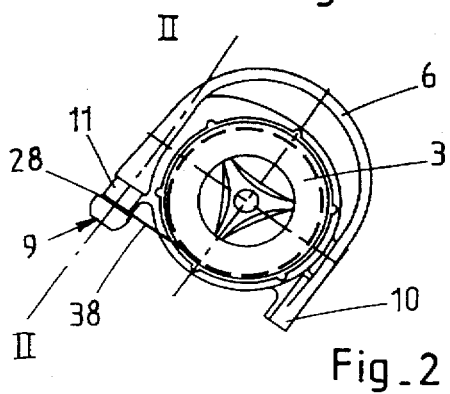
Fig_2
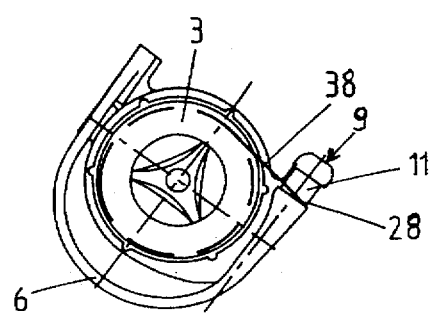
Fig_4

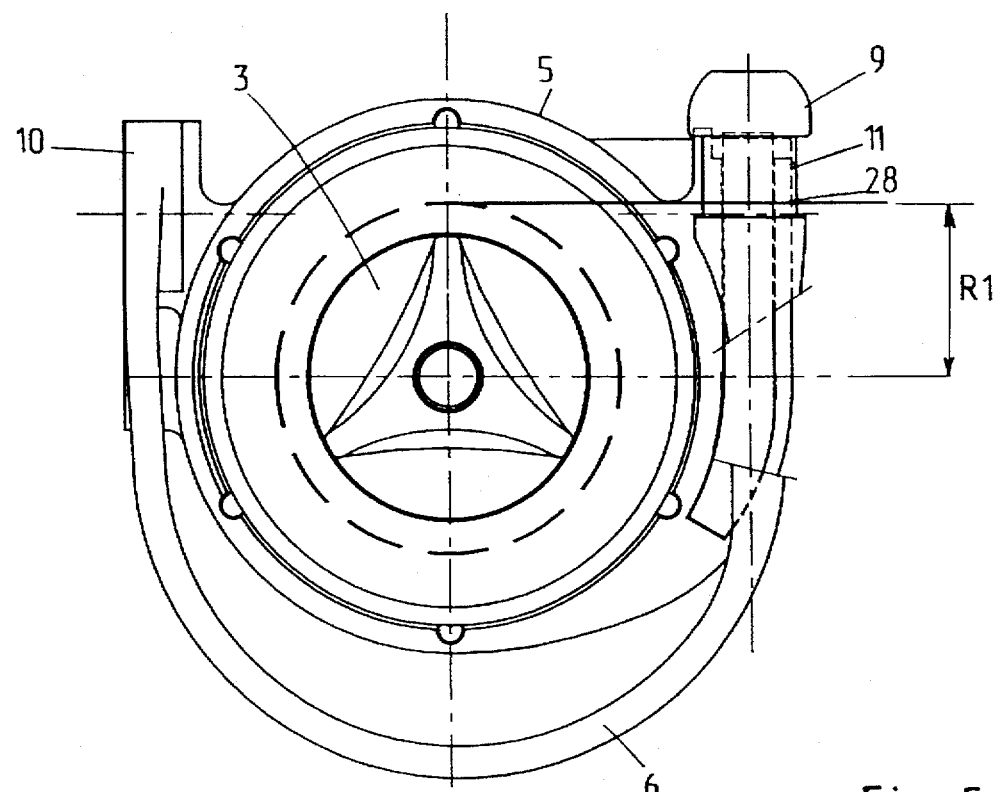
Fig_5
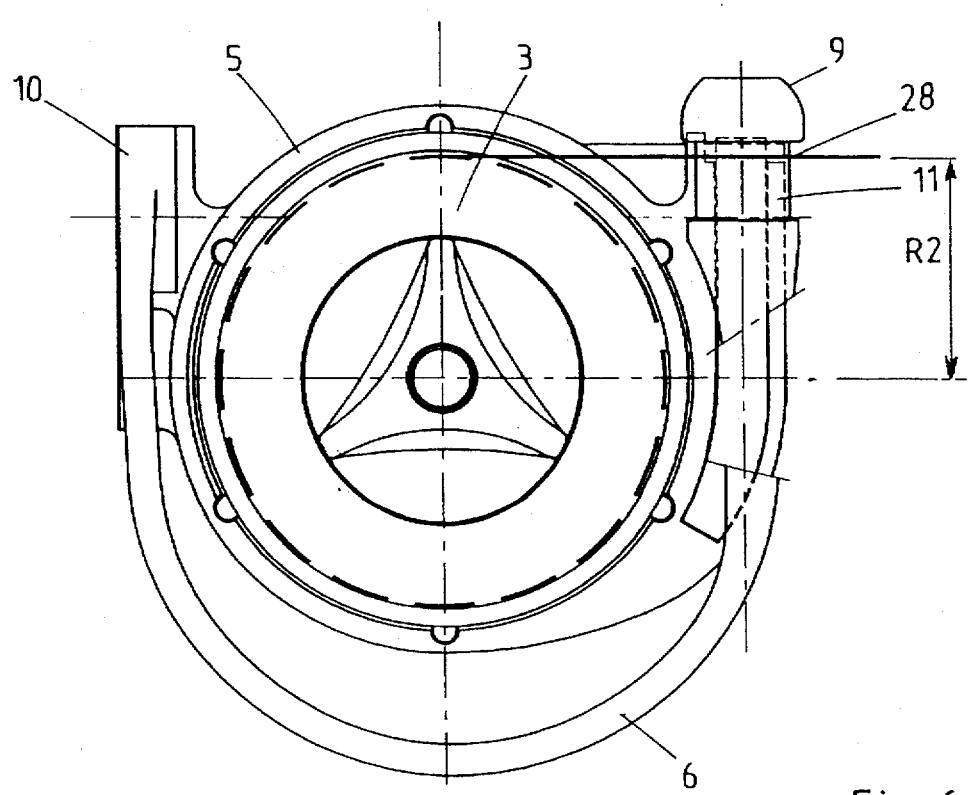
Fig_6

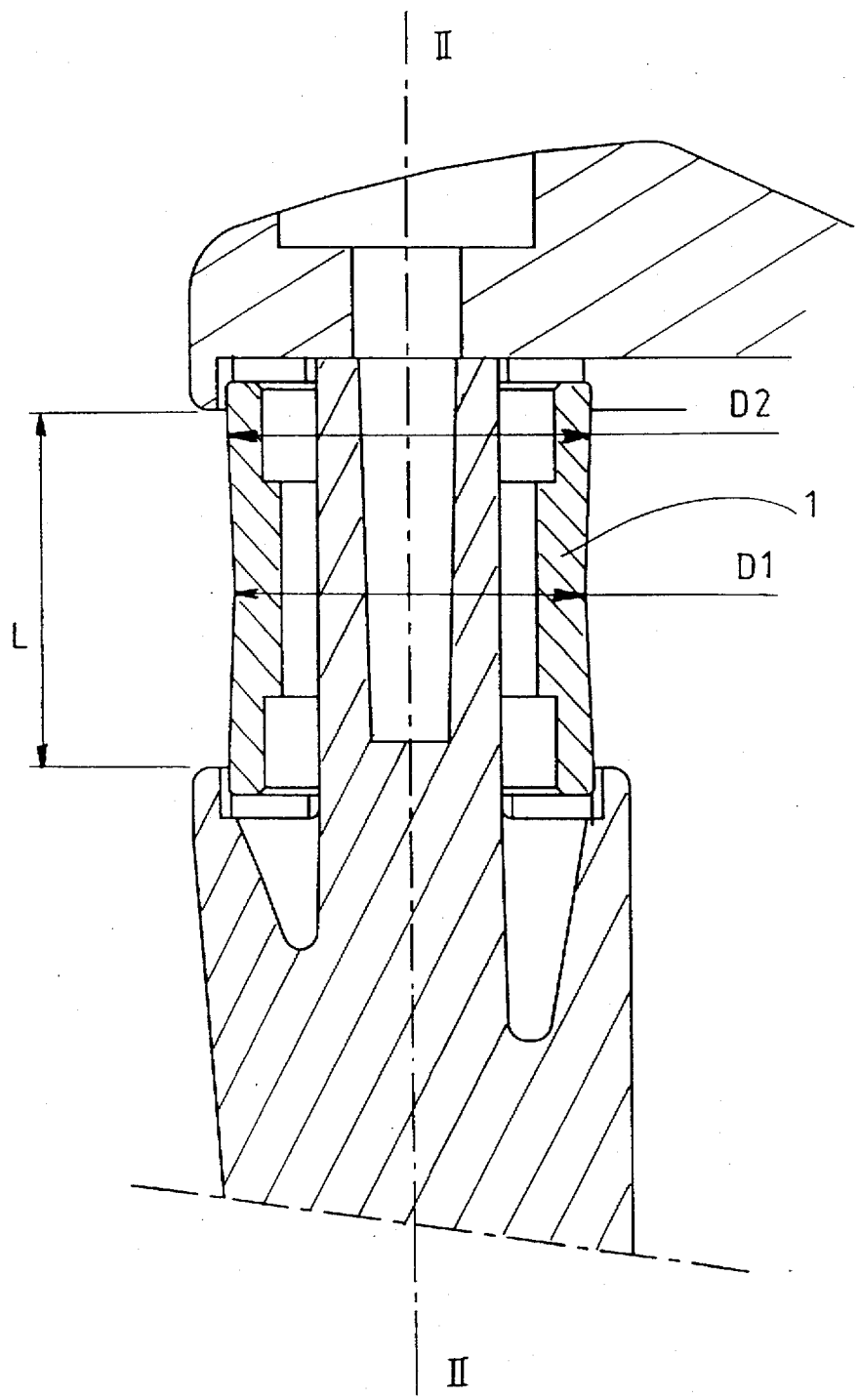
Fig_7

5,743,478

FISHING REEL WITH ADAPTABLE LINE GUIDE ROLLER

BACKGROUND OF THE INVENTION

1. Field of the Invention

The present invention concerns fishing reels of the type with a fixed spool and a rotary line recovery device in which the recovery device includes a rotary drum rotated axially by a crank handle and carrying a recovery device bail arm. The recovery device bail arm is retractable and to this end it is articulated to the drum to pivot between a retracted position releasing the fishing line to enable it to be fed off from the spool and a recovery position around the spool to recover the line and to guide it as it is wound onto the spool as the drum rotates.

2. Description of the Prior Art

When casting, the line is initially wound onto the spool. The angler pivots the recovery device bail arm into the retracted position and makes the cast, during which the line is paid off rapidly from the spool. After casting the line is slack. To recover it the angler turns the crank handle of the reel which rotates the rotary drum axially. On the reels usually employed, this rotation automatically causes the recovery device bail arm to pivot into the recovery position to guide the line as it is wound onto the spool. At the start of line recovery the line is usually engaged on an intermediary part of the recovery device bail arm and is progressively engaged around a first end of the bail arm of the recovery device. Said first end of the recovery device bail arm usually includes a rotary roller with a strongly concave longitudinal profile, encouraging the line to wrap around its small diameter central portion. Document U.S. Pat. No. 4,767,080 discloses a mechanism for orienting the rotation axis of the roller according to the amount of line wound onto the spool of the reel, further favoring movement of the line to the small diameter central portion of the roller.

Since this type of fishing reel was introduced, it has been found that the line gradually tends to twist after a shorter or longer period of use. This tendency to twist impedes the operation of casting, as it favors the simultaneous deployment of more than one turn from the spool, which causes tangling of the line.

The invention results from painstaking observation of the stresses exerted on the line during use of the reel and in particular during the line recovery operation. During the recovery operation the line is subjected to very considerable deformations as it passes over the small diameter central portion of the rotary roller at the first end of the recovery device bail arm.

The problem to which the present invention is addressed is that of designing a new fishing reel structure to reduce the gradual tendency to twisting of the fishing line after a period of use.

In accordance with the invention, the solution to this problem is to provide means for reducing the stresses exerted on the line during recovery, in particular by reducing its deformation.

SUMMARY OF THE INVENTION

To this end, the invention provides a fishing reel with fixed spool and rotary line recovery device in which a rotary drum adapted to be rotated axially by a crank handle carries a curved line recovery device bail arm, the recovery device bail arm being articulated to the drum at both ends to pivot about a transverse axis between a retracted position releasing the fishing line to enable it to be paid off from the spool and a recovery position around the spool during rotation of the drum, the first end of the recovery device bail arm carrying a roller rotatable about the axis of the recovery device bail arm so that, during recovery, the line is progressively engaged around said roller at the first end of the recovery device bail arm between the spool and a guide ring of the fishing pole, wherein:

the roller is cylindrical or has a slightly concave profile, the roller is of sufficient length to allow unimpeded axial displacement of an intermediate line portion remaining engaged on the roller, according to the amplitude of the natural axial movement of the line due to variation in the amount of line wound onto the spool and to variation in the relative orientation of a downstream part of the line between the recovery device bail arm and the guide ring.

By allowing the fishing line to move over a sufficient length of the roller in this way, the longitudinal position of the line on the roller can vary continuously to reduce the angle of deviation between the part of the line on the upstream side of the recovery device bail arm and the part of the line on the downstream side of the recovery device bail arm, and lateral friction on the line is eliminated. The result is a significant reduction in the tendency of the line to twist after a period of use.

Other objects, features and advantages of the present invention will emerge from the following description of specific embodiments of the invention given with reference to the appended drawings.

BRIEF DESCRIPTION OF THE DRAWINGS

FIG. 1 is a partial side view of a fishing pole fitted with a fishing reel of the invention, in a first position of the recovery device, with a fishing line taut during recovery.

FIG. 2 is a front view of the reel in the same position as FIG. 1.

FIG. 3 is a side view of the pole and the reel from FIG. 1 with the recovery device in an extreme second position.

FIG. 4 is a front view of the reel in the same position as FIG. 3.

FIGS. 5 and 6 are front views of the reel showing the displacement of the line on the recovery device roller as a function of the quantity of line wound onto the spool.

FIG. 7 is a side view of a preferred embodiment of the recovery device roller of the invention in section and to a larger scale.

DETAILED DESCRIPTION OF THE PREFERRED EMBODIMENT

Referring to FIG. 1, the fishing reels usually employed for casting (called "spinning reels") include a reel body 1 provided with means for fixing it to a fishing pole 2. The reel body 1 carries a spool 3 the longitudinal axis of symmetry I—I of which is substantially parallel to the lengthwise direction of the fishing pole 2. Line recovery means include a crank handle 4 that can be turned by the user to rotate a drum 5 rotatable about the axis I—I of the spool 3 through a transmission mechanism inside the reel body 1. The drum 5 carries a curved retractable line recovery device bail arm 6 articulated to the drum 5 about a transverse rotation axis 7 to pivot between a retracted position, not shown in the figures, releasing the fishing line 8 to enable it to be paid off from the spool 3 and a recovery position shown in the other figures in which the recovery device bail arm 6 surrounds the spool 3 to recover the line 8 and guide it as it is wound onto the spool 3 by rotation of the drum 5.

The recovery device bail arm 6 has a first end 9 and a second end 10 between which the intermediate part of the bail arm 6 is curved, as shown in the figures.

During line recovery by a fixed spool fishing reel of this type, the user turns the crank handle 4 which, via the internal transmission mechanism, causes axial translatory reciprocation of the spool 3 and, simultaneously, rotation of the drum 5 about the axis I—I. The line 8 is guided by the recovery device bail arm 6, which winds it progressively around the spool 3. At the start of recovery the line 8 is captured by the intermediate part of the recovery device bail arm 6 and, due to the rotation of the recovery device, the line 8 is progressively engaged around the first end 9 of the recovery device bail arm 6.

To reduce friction and wear of the line, the first end 9 of the recovery device bail arm 6 carries a roller 11 rotatable about the axis II—II of the recovery device bail arm 6.

The roller 11 is cylindrical or has a slightly concave profile. The length L of the roller is sufficient to allow unimpeded axial displacement of the line with amplitudes conditioned by variations in the position of the recovery device during the line recovery stage and by variations in the outside diameter of the spool depending on how much line has been wound onto it.

The appended figures show these variations.

FIGS. 1 and 2 show a first extreme position of the recovery device in which the roller 11 at the first end 9 is as close as possible to the fishing pole 2. The line 8 has a taut downstream part 18 between the roller 11 and a first guide ring 12 on the fishing pole 2, an intermediate part 28 curved around a portion of the roller 11, and a taut upstream part 38 between the roller 11 and the spool 3. In the first extreme position, FIGS. 1 and 2, the intermediate line portion 28 tends naturally to take up a position on the roller 11 as close as possible to the first end 9 of the recovery device bail arm 6.

FIGS. 3 and 4 show the recovery device in its second extreme position, in which the roller 11 is moved away from the fishing pole 2. The intermediate line part 28 tends to take up a position on the part of the roller 11 farthest from the first end 9 of the recovery device bail arm 6.

Accordingly, the length L of the roller 11 is chosen to allow unimpeded displacement of the intermediate line part 28 between its two extreme positions. These extreme positions depend both on the dimensions of the reel and on its position on the fishing pole 2 relative to the ring 12. The person skilled in the art will have no difficulty in determining the length L required for the roller 11, for example by means of a test to identify the extreme positions of the intermediate line part 28 as a function of conditions of use.

FIGS. 5 and 6 show the other cause of variation in the position of the line on the roller 11: in FIG. 5, the spool 3 carries a short length of line wound onto it, with the result that the apparent outside radius R1 of the spool is relatively small. The intermediate line part 28 then tends to assume a position on the roller 11 as far as possible from the first end 9 of the recovery device bail arm 6.

In FIG. 6 a large quantity of line is wound around the spool 3, however, with the result that its apparent outside radius R2 is larger. In this case the intermediate line part 28 tends to take up a position on the roller 11 as close as possible to the first end 9 of the recovery device bail arm 6.

The choice of the length L of the roller 11 must allow for the two causes of variation in the position of the intermediate line part 28 on the roller 11, namely the variation in the relative orientation of the downstream line part 18 and the variation in the apparent outside radius of the spool 3, i.e. the variation in how much line is wound onto the spool 3.

Good results have been obtained with a roller 11 the length L of which is between one-quarter and one-half the maximum apparent outside radius R2 of the spool 3.

The length L of the roller 11 must in all cases be greater than the maximum depth of the layer of line on the spool 3, to allow for the variations shown in FIGS. 5 and 6.

FIG. 7 shows a preferred embodiment of the roller 11 which has a slightly concave longitudinal profile. The diameter D1 of the roller 11 in its central part is less than its diameter D2 at each end.

Given the usual conditions under which fishing reels are made, the difference between the maximum diameter D2 at the ends and the minimum diameter D1 of the central part of the roller 11 is between about 0.1 mm and about 1 mm.

The present invention is not limited to the embodiments explicitly described, but includes variants and generalizations thereof within the scope of the following claims.

There is claimed:

1. A fishing reel comprising:

a spool having a line collecting portion positioned about an axial centerline for storing a predetermined maximum amount of wound fishing line spaced from the centerline by a predetermined maximum radial distance;

a line recovery device rotatably secured around the spool, the line recovery device including a bail arm movable between open and closed positions for paying out line from the spool and for wrapping line around the line collecting portion, respectively, and a line guide roller mounted around a portion of the bail arm, the line guide roller being substantially cylindrical and having first and second tapered portions extending from first and second ends thereof and converging with one another at a central part of smaller diameter than the first and second ends, the line guide roller having a length of between one-half and one-quarter of the predetermined maximum radial distance.

2. The fishing reel of claim 1, wherein the line collecting portion has a predetermined first inner radius and the spool is configured to hold a quantity of line resulting in a second outer radius, and wherein the line guide roller has a length greater than the difference between the first and second radii.

3. The fishing reel of claim 1, wherein the line guide roller has a first diameter adjacent to the first and second ends thereof and a second diameter at the central part thereof, the second diameter being approximately 0.1 mm to 1.0 mm smaller than the first diameter.

4. A fishing reel comprising:

a spool having a line collecting portion positioned about an axial centerline for storing a predetermined maximum amount of wound fishing line spaced from the centerline by a predetermined maximum radial distance;

a line recovery device rotatably secured around the spool, the line recovery device including a bail arm movable between open and closed positions for paying out line from the spool and for wrapping line around the line collecting portion, respectively, and a line guide roller mounted around a portion of the bail arm, the line guide roller being substantially cylindrical and having a concave longitudinal profile comprising first diameter portions adjacent to ends thereof and converging in a second diameter portion in a center region, the second diameter portion being smaller in diameter than the first diameter portion by approximately 0.1 mm to 1.0 mm, the line collecting portion having a predetermined radius and the line guide roller having a length of between one-half and one-quarter of the radius of the line collecting portion.

5. The fishing reel of claim 4, wherein the spool is secured to the reel for reciprocating motion and the line guide roller has a length sufficient to permit substantially unimpeded displacement of line along the roller as the spool moves between extreme reciprocated positions.

6. The fishing reel of claim 4, wherein the line collecting portion has a predetermined first inner radius and the spool is configured to hold a quantity of line resulting in a second outer radius, and wherein the line guide roller has a length greater than the difference between the first and second radii.

7. A fishing reel comprising:

a spool having a line collecting portion for storing fishing line;

a line recovery device rotatably secured around the spool, the line recovery device including a bail arm movable between open and closed positions for paying out line from the spool and for wrapping line around the line collecting portion, respectively; and a line guide roller mounted around a portion of the bail arm, the line guide roller being substantially cylindrical and having first and second tapered portions extending from first and second ends thereof and converging with one another at a central part of smaller diameter than the first and second ends, the line collecting portion having a predetermined first inner radius and the spool being configured to hold a maximum quantity of line resulting in a second outer radius, and wherein the line guide roller has a length greater than the difference between the first and second radii.

8. The fishing reel of claim 7, wherein the line guide roller has a length of between one-half and one-quarter of the second outer radius of the line collecting portion.

9. A fishing reel comprising:

a spool having a line collecting portion for storing fishing line;

a line recovery device rotatably secured around the spool, the line recovery device including a bail arm movable between open and closed positions for paying out line from the spool and for wrapping line around the line collecting portion, respectively; and a line guide roller mounted around a portion of the bail arm, the line guide roller being substantially cylindrical and having a concave longitudinal profile comprising first diameter portions adjacent to ends thereof and converging in a second diameter portion in a center region, the second diameter portion being smaller in diameter than the first diameter portion by approximately 0.1 mm to 1.0 mm, the line collecting portion having a predetermined first inner radius and the spool being configured to hold a quantity of line resulting in a second outer radius, wherein the line guide roller has a length greater than the difference between the first and second radii.

10. A fishing reel comprising:

a spool having a line collecting portion positioned about an axial centerline for storing a predetermined maximum amount of wound fishing line spaced from the centerline by a predetermined maximum radial distance;

a line recovery device rotatably secured around the spool, the line recovery device including a bail arm movable between open and closed positions for paying out line from the spool and for wrapping line around the line collecting portion, respectively; and a line guide roller mounted adjacent to the line recovery device, the line guide roller being substantially cylindrical and having first and second end portions of first and second diameters, respectively, and an intermediate portion of a diameter smaller than the first and second diameters, the line collecting portion having a predetermined radius and the line guide roller having a length of at least one-quarter of the maximum radial distance.

11. A fishing reel comprising:

a spool having a line collecting portion for storing fishing line;

a line recovery device rotatably secured around the spool, the line recovery device including a bail arm movable between open and closed positions for paying out line from the spool and for wrapping line around the line collecting portion, respectively; and a line guide roller mounted adjacent to the line recovery device, the line guide roller being substantially cylindrical and having first and second end portions of first and second diameters, respectively, and an intermediate portion of a diameter smaller than the first and second diameters, the line collecting portion having a predetermined first inner radius and the spool being configured to hold a maximum quantity of line resulting in a second radius, and wherein the line guide roller has a length greater than the difference between the first and second radii.

12. A fishing reel comprising:

a spool having a line collecting portion positioned about an axial centerline for storing a predetermined maximum amount of wound fishing line spaced from the centerline by a predetermined maximum radial distance;

a line recovery device rotatably secured around the spool, the line recovery device including a bail arm movable between open and closed positions for paying out line from the spool and for wrapping line around the line collecting portion, respectively, and a line guide roller mounted around a portion of the bail arm, the line guide roller having a length of between one-half and one-quarter of the predetermined maximum radial distance.

13. A fishing reel comprising:

a spool having a line collecting portion for storing fishing line;

a line recovery device rotatably secured around the spool, the line recovery device including a bail arm movable between open and closed positions for paying out line from the spool and for wrapping line around the line collecting portion, respectively; and a line guide roller mounted around a portion of the bail arm, the line collecting portion having a predetermined first inner radius and the spool being configured to hold a maximum quantity of line resulting in a second outer radius, and wherein the line guide roller has a length greater than the difference between the first and second radii.

* * * * *